United States Patent [19]

Shibasaki et al.

[11] Patent Number: 5,684,673
[45] Date of Patent: Nov. 4, 1997

[54] ELECTRONIC SYSTEM HAVING A PORTABLE ELECTRONIC APPARATUS AND AN EXTENTION UNIT FOR EXTENDING FUNCTIONS OF THE PORTABLE ELECTRONIC APPARATUS

[75] Inventors: Kazuya Shibasaki; Ryoji Ninomiya, both of Tokyo, Japan

[73] Assignee: Kabushiki Kaisha Toshiba, Kawasaki, Japan

[21] Appl. No.: 314,762

[22] Filed: Sep. 29, 1994

[30]    Foreign Application Priority Data

Sep. 30, 1993   [JP]   Japan .................................... 5-244417

[51] Int. Cl.$^6$ ............................. G06F 1/16; H05K 7/10
[52] U.S. Cl. ......................... 364/686; 361/726; 439/153
[58] Field of Search ........................... 361/683, 684, 361/686, 679, 726, 685, 727; 439/152, 153, 928, 929; 364/708.1; G06F 1/16

[56]    References Cited

U.S. PATENT DOCUMENTS

| | | | |
|---|---|---|---|
| 4,659,159 | 4/1987 | Takahashi | 339/75 M |
| 5,175,671 | 12/1992 | Sasaki | 361/686 |
| 5,292,267 | 3/1994 | Kobayashi et al. | |
| 5,310,358 | 5/1994 | Johnson et al. | 439/358 |
| 5,313,596 | 5/1994 | Swindler et al. | |
| 5,316,491 | 5/1994 | Satou et al. | |
| 5,323,291 | 6/1994 | Boyle et al. | |
| 5,347,425 | 9/1994 | Herron et al. | 361/683 |
| 5,348,489 | 9/1994 | Yeh | 439/153 |
| 5,450,271 | 9/1995 | Fukushima et al. | 361/686 |
| 5,477,415 | 12/1995 | Mitcham et al. | 361/681 |

FOREIGN PATENT DOCUMENTS

| | | | |
|---|---|---|---|
| 406083484 | 3/1994 | Japan | 361/686 |
| 88/06780 | 9/1988 | WIPO | |

*Primary Examiner*—Leo P. Picard
*Assistant Examiner*—Lynn D. Feild
*Attorney, Agent, or Firm*—Cushman Darby & Cushman IP Group of Pillsbury Madison & Sutro LLP

[57]    ABSTRACT

An electronic system comprises an electronic apparatus having a keyboard and a first connector, and an extension unit containing an extension device. The extension unit comprises a mount surface on which the electronic apparatus is detachably mounted, a second connector provided on the mount surface, the second connector being movable between a first position where the second connector adjoins the electronic apparatus placed on the mount surface and a second position where the second connector is away from the electronic apparatus, the second connector being coupled to the first connector when the second connector is moved to the first position, an engaging section provided on the mount surface, the engaging section being movable between a lock position where the engaging section is engaged with the electronic apparatus and thereby holds the electronic apparatus on the mount surface, and an unlock position where the engaging section is disengaged from the electronic apparatus, and a driving unit for moving the engaging section between the lock position and the unlock position and moving the second connector between the first position and the second position.

31 Claims, 6 Drawing Sheets

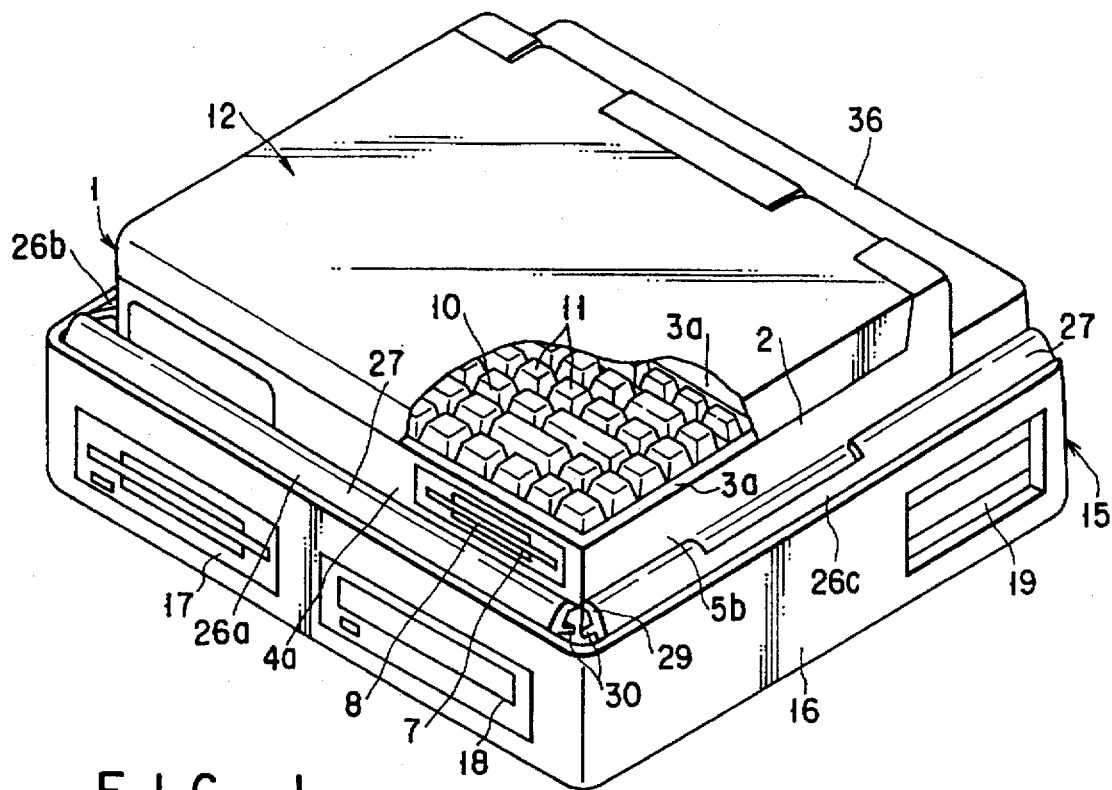
F I G. 1
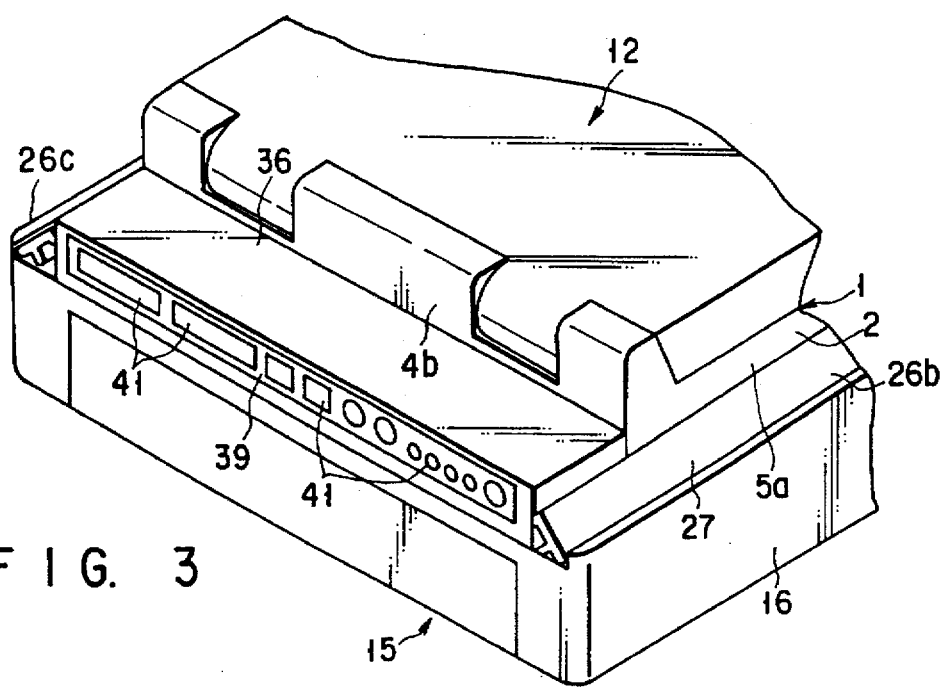
F I G. 3

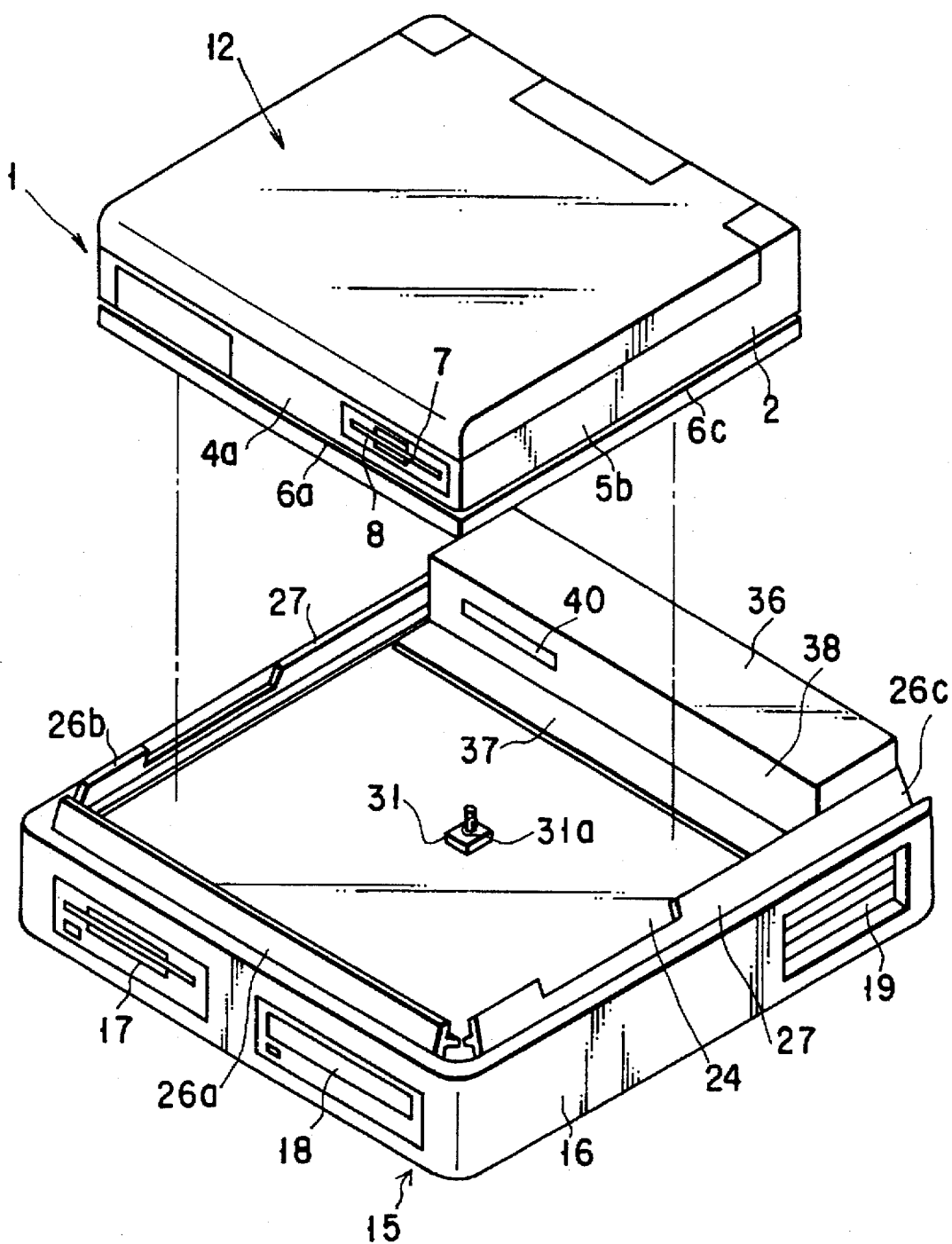
F I G. 2

ELECTRONIC SYSTEM HAVING A PORTABLE ELECTRONIC APPARATUS AND AN EXTENTION UNIT FOR EXTENDING FUNCTIONS OF THE PORTABLE ELECTRONIC APPARATUS

BACKGROUND OF THE INVENTION

1. Field of the Invention

The present invention relates generally to an electronic system having a portable electronic apparatus, such as a book-type portable computer, and an extension unit for use in extending the functions of the portable electronic apparatus, and more particularly to the structure of the extension unit.

2. Description of the Related Art

A portable electronic apparatus such as a book-type or note-type computer has advantages: the apparatus can be easily carried, and the apparatus can be freely used even in a location where commercial power supply is unavailable, by making use of a battery pack built into the apparatus.

This type of electronic apparatus is designed in a compact size in order to enhance portability. As compared to a desk-top computer, the number of standard functions in the portable electronic apparatus is limited. When the portable electronic apparatus needs to be provided with a nonstandard additional function, the apparatus is conventionally connected to a function extending device with the additional function, e.g. a CD-ROM or a hard-disk drive.

U.S. Pat. No. 4,769,764 and U.S. Pat. No. 4,903,222 show examples of a device for extending the functions of a portable electronic apparatus. The prior-art extension device, as shown in these documents, has a storage recess. This storage recess has a size corresponding to the electronic apparatus. The storage recess is opened continuously upward and forward of the extension device. Accordingly, the electronic apparatus can be detachably inserted in the storage recess from the above or front of the extension device by an operator's manual procedure. A rear surface of the electronic apparatus is provided with a first connector for use in extending the functions of the apparatus. When the electronic apparatus is inserted in the storage recess, the first connector is connected to a second connector disposed within the storage recess. Thereby, the electronic apparatus is electrically connected to the extension device.

In the prior art, however, when the functions of the electronic apparatus are extended, the electronic apparatus needs to be manually inserted in the storage recess to mutually connect the first and second connectors. At this time, if the electronic apparatus is inserted in the storage recess at a wrong angle or the electronic apparatus is inclined, the first connector does not face the second connector precisely. Consequently, a damaging force acts on the first and second connectors, resulting in deformation or defective connection of the connectors.

According to the above structure, the fixation between the extension device and the electronic apparatus is maintained by the engaging force of the first and second connectors. If the electronic apparatus is pulled or lifted by mistake while the first and second connectors are mutually coupled, the connectors may be separated and electrical connection between the electronic apparatus and the extension device may be released. In particular, if the electrical connection between the extension device and the electronic apparatus is released while the extension device is being used, important data may be lost or the electric apparatus may malfunction.

In order to solve this problem, an extension device having a lock mechanism for locking the electronic apparatus in the storage recess has recently been proposed. According to this structure, however, the locking mechanism needs to be set in the locking position after the electronic apparatus is inserted in the storage recess. In addition, when the electronic apparatus is removed from the storage recess, the locking of the electronic apparatus by the locking mechanism must be released in advance. Thus, the attachment and detachment of the electronic apparatus is time-consuming. Furthermore, if the operator fails to lock the electronic apparatus, the electronic apparatus is easily removed from the storage recess since it is held in the recess only by the mutual engaging force of the connectors. Thus, safety against stealing of the electric apparatus is not ensured.

SUMMARY OF THE INVENTION

The present invention has been made under the above circumstances, and an object of the invention is to provide an electronic system with high operability, which realizes easy attachment/detachment of an electronic apparatus to/from an extension unit.

Another object of the invention is to provide an electronic system wherein an electronic apparatus can be surely held on a mount surface, and stealing of the electronic apparatus can be effectively prevented.

Still another object of the invention is to provide an electronic system wherein driving means of an extension unit can be controlled by making use of input means of an electronic apparatus, and unintentional removal or stealing of the electronic apparatus can be prevented.

Still another object of the invention is to provide an electronic system wherein a first connector and a second connector are surely coupled to each other, irrespective of the weight of an electronic apparatus.

In order to achieve the above objects, there is provided an electronic system comprising: an electronic apparatus having a top surface and a rear surface continuous a with the top surface, the top surface being provided with input means for inputting information, and the rear surface being provided with a first connector; and an extension unit containing an extension device for extending the function of the electronic apparatus, wherein the extension unit comprises: a mount surface on which the electronic apparatus is detachably mounted; a second connector provided on the mount surface, the second connector being movable between a first position where the second connector adjoins the electronic apparatus placed on the mount surface and a second position where the second connector is away from the electronic apparatus placed on the mount surface, the second connector being coupled to the first connector when the second connector is moved to the first position; engaging means provided on the mount surface, the engaging means being movable between a lock position where the engaging means is engaged with the electronic apparatus and thereby holds the electronic apparatus on the mount surface, and an unlock position where the engaging means is disengaged from the electronic apparatus; and driving means for moving the engaging means between the lock position and the unlock position and moving the second connector between the first position and the second position.

With the above structure, when the electronic apparatus is connected to the extension unit, the electronic apparatus is first placed on the mount surface of the extension unit. The driving means is then activated to move the engaging means from the first position to the second position. Thus, the engaging means is engaged with the electronic apparatus, and the electronic apparatus is held on the mount surface in a fixed position. After the electronic apparatus has been positioned, the second connector is moved to the first position so as to be coupled to the first connector. Thus, the electronic apparatus is electrically connected to the extension unit.

According to this structure, the electrical connection and mechanical fixation between the electronic apparatus and the extension unit are automatically affected by the driving means. Accordingly, it should suffice to place the electronic apparatus on the mount surface, and there is no need to perform a time-consuming procedure of, for example, manually sliding the electronic apparatus placed on the mount surface.

Since the electronic apparatus is electrically connected to the extension unit, the driving means of the extension unit can be controlled by using the input means of the electronic apparatus. In order to move the engaging means between the lock position and the unlock position or to move the second connector between the first position and the second position, it is necessary to operate the input means according to predetermined procedures. Unless one knows the operation procedures, he cannot remove the electronic apparatus from the mount surface, and therefore stealing of the electronic apparatus can be prevented.

When the electronic apparatus is removed from the extension unit, the second connector is moved from the first position to the second position by the driving means and is disengaged from the first connector. In this case, since the electronic apparatus is fixed on the mount surface by the engaging means, the electronic apparatus does not move or incline in accordance with the motion of the second connector. Thus, the second connector can be exactly disengaged from the first connector. After the second connector is disengaged from the first connector, the engaging means is moved from the lock position to the unlock position by the driving means. Thus, the engaging means is disengaged from the electronic apparatus. Thereby, the holding of the electronic apparatus on the mount surface is released, and the electronic apparatus can be removed from the mount surface. Therefore, unlike the prior art, there is no need to perform time-consuming procedures such as unlocking the electronic apparatus and pulling the electronic apparatus against the engaging force of the first and second connectors.

According to the present invention, there is also provided an electronic system comprising: an electronic apparatus having means for inputting information and a first connector; and an extension unit having a second connector detachably coupled to the first connector, the extension unit including a mount surface on which the electronic apparatus is detachably mounted, engaging means being movable between a lock position where the engaging means is engaged with the electronic apparatus and thereby holds the electronic apparatus on the mount surface, and an unlock position where the engaging means is disengaged from the electronic apparatus, and driving means for moving the engaging means between the lock position and the unlock position.

With the above structure, when the electronic apparatus is connected to the extension unit, the electronic apparatus is first placed on the mount surface of the extension unit. The driving means is then activated to move the engaging means from the first position to the second position. Thus, the engaging means is engaged with the electronic apparatus, and the electronic apparatus is held on the mount surface in a fixed position. At the same time, the first and second connectors are coupled, and the electronic apparatus is electrically connected to the extension unit.

According to this structure, the electronic apparatus is connected to the extension unit only by placing the electronic apparatus on the mount surface. Thus, there is no need to perform time-consuming procedures of, for example, manually sliding the electronic apparatus placed on the mount surface and locking the electronic apparatus on the mount surface. The electronic apparatus can be connected easily.

Since the electronic apparatus is electrically connected to the extension unit, the driving means of the extension unit can be controlled by using the input means of the electronic apparatus. In order to move the engaging means between the lock position and the unlock position, it is necessary to operate the input means according to predetermined procedures. Unless one knows the operation procedures, he cannot remove the electronic apparatus from the mount surface, and therefore stealing of the electronic apparatus can be prevented.

When the electronic apparatus is removed from the extension unit, the engaging means is moved from the lock position to the unlock position by the driving means, and the engaging means is disengaged from the electronic apparatus. Thereby, the holding of the electronic apparatus on the mount surface is released, and the electronic apparatus can be removed from the mount surface.

According to the present invention, there is also provided an electronic system comprising:

an electronic apparatus having a first connector on a rear surface thereof; and an extension unit having a mount surface on which the electronic apparatus is detachably mounted, the extension unit including a second connector movable toward and away from the electronic apparatus placed on the mount surface, the second connector being coupled to the first connector when the second connector is moved toward the electronic apparatus.

With the above structure, when the electronic apparatus is connected to the extension unit, the electronic apparatus is first placed on the mount surface of the extension unit. Then, the second connector is moved toward the electronic apparatus. Thus, the second connector is coupled to the first connector and the electronic apparatus is electrically connected to the extension unit. When the electronic apparatus is removed from the extension unit, the second connector is moved away from the electronic apparatus. Thereby, the second connector is disengaged from the first connector, and the connection between the electronic apparatus and the extension unit is released.

According to the above structure, when the electronic apparatus is connected to, and disconnected from, the extension unit, it should suffice if the second connector which is much smaller than the electronic apparatus is moved. Specifically, if the first connector is coupled to the second connector by sliding the electronic apparatus and, in particular, if the electronic apparatus is heavy, a great sliding force is required. Consequently, the first connector may be coupled to the second connector with an excessive engaging force greater than an optimal level. In this case, the first and second connectors may be damaged. By contrast, if the small second connector is moved, the engaging force between the first and second connectors is not adversely affected by the weight of the electronic apparatus. Thus, the engaging force between the first and second connectors can easily be controlled and the damage to the connectors can be prevented.

According to an electronic system of the present invention, the extension unit has driving means for moving the second connector toward and away from the electronic apparatus, and the driving means includes an electric motor and an interlock mechanism for interlocking the electric motor and the second connector.

According to this structure, the second connector is automatically moved toward and away from the electronic apparatus, and the speed of movement of the second connector is kept constant. Thus, a variation in engaging force acting between the first and second connectors is reduced, and the reliability of connection these connectors is enhanced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 to 6 show an electronic system according to a first embodiment of the present invention, in which FIG. 1 is a perspective view showing the state in which a portable computer and an extension unit are mutually connected, FIG. 2 is an exploded view showing the state in which the portable computer and the extension unit are disconnected from each other, FIG. 3 is a rear view of the portable computer and the extension unit which are mutually connected, FIG. 4 is a cross-sectional view showing the state in which the portable computer is fixed on a mount surface via engaging sections, FIG. 5 is a partially cross-sectional side view showing the positional relationship between the portable computer placed on the mount surface and a connector unit, and FIG. 6 is a perspective view of driving means for moving the engaging sections and the connector unit; and FIGS. 7 and 8 show an electronic system according to a second embodiment of the present invention, in which FIG. 7 is an exploded view showing the state in which a portable computer and an extension unit are disconnected from each other, and FIG. 8 is a cross-sectional view showing the positional relationship between the portable computer placed on a mount surface and a first connector.

DETAILED DESCRIPTION OF THE PREFERRED EMBODIMENTS

Figure 4:
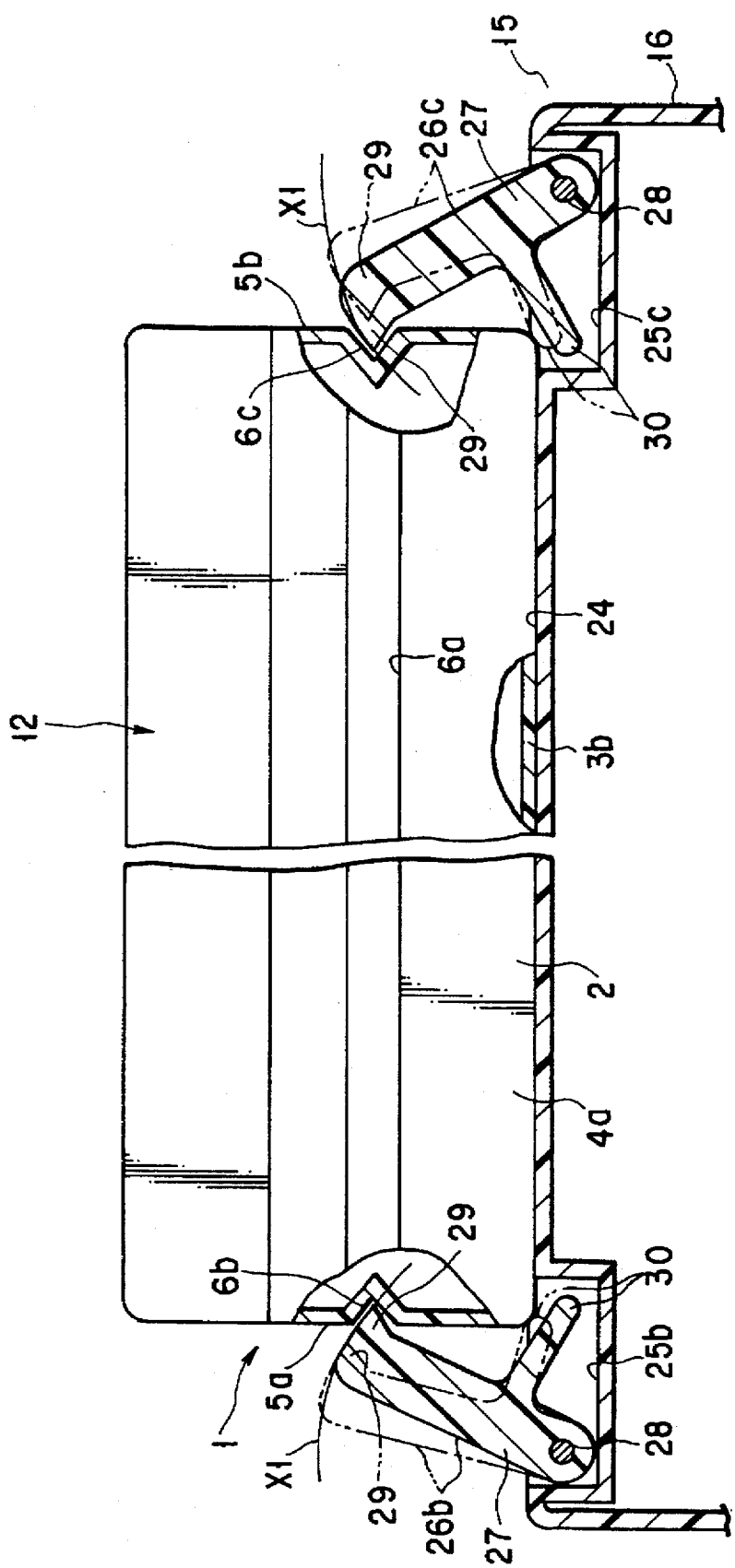

A first embodiment of the present invention will now be described with reference to FIGS. 1 to 6.

In FIGS. 1 and 2, reference numeral 1 denotes a book-type portable computer as an electronic apparatus. The computer 1 has a rectangular box body 2. The box body 2 has mutually opposed top and bottom surfaces 3a and 3b, front and rear surfaces 4a and 4b, and right and left side surfaces 5a and 5b. The front surface 4a and right and left side surfaces 5a and 5b of the box body 2 are provided with recess portions 6a to 6c. The recess portion 6a extends horizontally over the entire length in the width direction of the front surface 4a. The recess portions 6b and 6c extend horizontally over the entire lengths in the depth direction (i.e. front-to-rear direction) of the side surfaces 5a and 5b.

Figure 5:
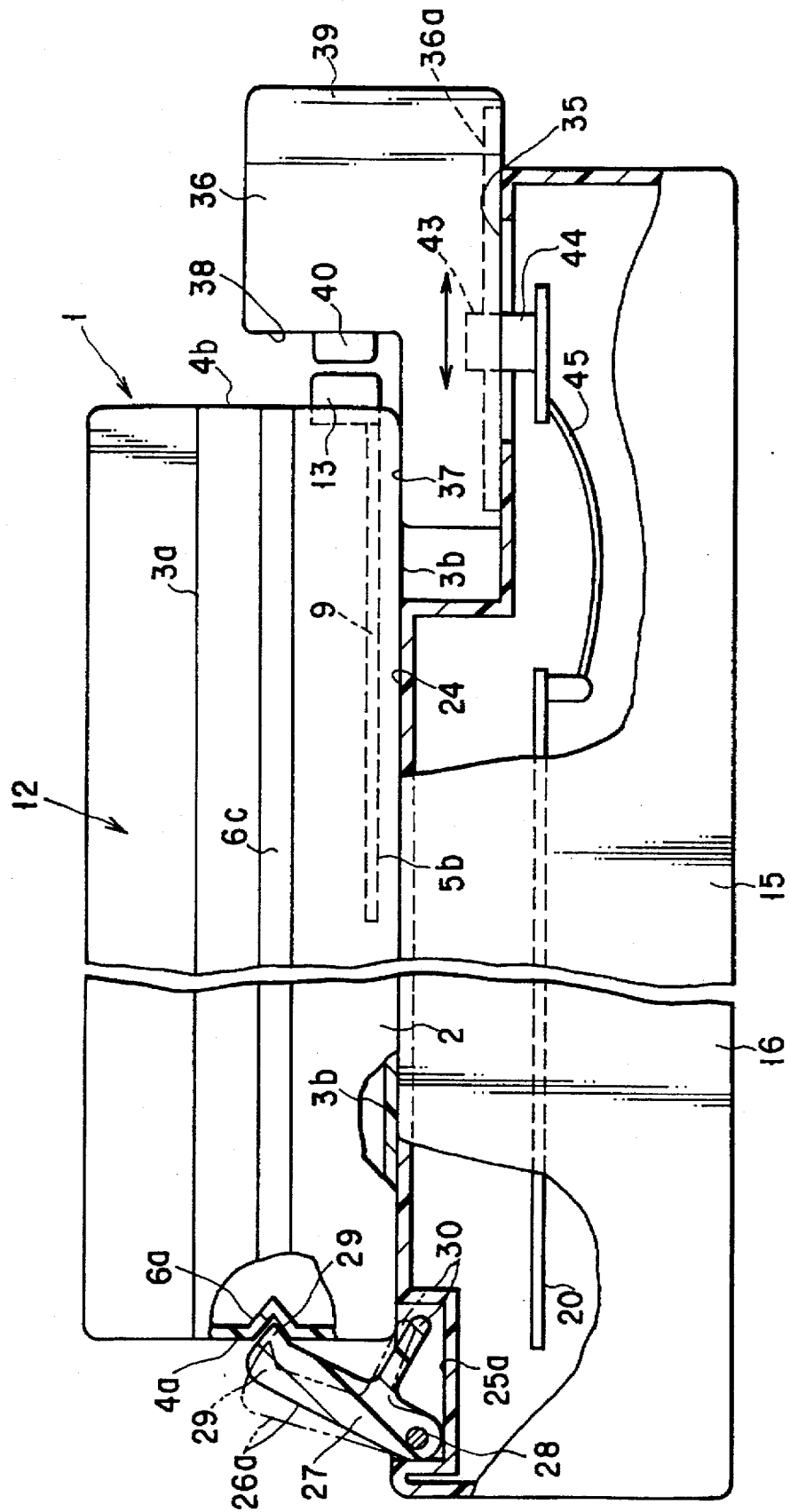

A floppy disk drive (FDD) 7 and a circuit board 9 are contained within the box body 2. The FDD 7 has an insertion port 8 for insertion of a floppy disk. The insertion port 8 is opened in the front surface 4a of the box body 2. As is shown in FIG. 5, the circuit board 9 is disposed in parallel to the bottom surface 3b within the box body 2. The FDD 7 is electrically connected to the circuit board 9.

A keyboard 10 functioning as information input means is disposed on the top surface 3a of the box body 2. The keyboard 10 has a number of keys 11. The keys 11 are exposed to the top surface 3a of the box body 2. The keyboard 10 is electrically connected to the circuit board 9.

As is shown in FIGS. 1 and 2, a flat panel type display unit 12 is attached to the box body 2. The display unit 12 is electrically connected to the circuit board 9 via a cable (not shown). The display unit 12 is supported on the box body 2 so as to be rotatable between a closed position where the display unit 12 covers the keyboard 10 from above and an open position where the display unit 12 is erected behind the keyboard 10. In the state in which the display unit 12 is rotated in the closed position, a peripheral surface of the display unit 12 is flush with the front surface 4a and right and left side surfaces 5a and 5b of the box body 2 so that the computer 1 has a box shape and is conveniently carried.

As is shown in FIG. 5, a first connector 13 is disposed on the rear surface 4b of the box body 2. The first connector 13 is supported on a rear end portion of the circuit board 9. The first connector 13 is electrically connected to the FDD 7, keyboard 10 and display unit 12 via the circuit board 9.

When the functions of the computer 1 are extended, an extension unit 15, as shown in FIGS. 1 and 2, is used. The extension unit 15 has a casing 16. The casing 16 has a rectangular box shape and a greater size than the box body 2. The casing 16 contains devices for extending the functions of the computer 1, such as a CD-ROM 17 and a hard disk drive (HDD) 18, and a circuit board 20. The circuit board 20 is electrically connected to the CD-ROM 17 and HDD 18. The casing 16 has an extension slot 19 for insertion of a modem card or an application card.

The casing 16 has a horizontal mount surface 24 on which the box body 2 of the computer 1 is placed. The mount surface 24 is a flat surface with substantially the same size as the bottom surface 3b of the box body 2. As is shown in FIGS. 4 and 5, first to third attachment recess portions 25a, 25b and 25c are formed at a front edge portion and right and left side edge portions of the mount surface 24. The first attachment recess portion 25a extends over the entire length in the width direction of the front edge portion of the mount surface 24. The second and third attachment recess portions 25a and 25b extend over the entire lengths in the depth direction of the right and left side edge portions of the mount surface 24.

As is shown in FIG. 2, the extension unit 15 has engaging means for detachably fixing the computer 1 to the mount surface 24. The engaging means comprises first to third engaging sections 26a, 26b and 26c. As is shown in FIGS. 4 and 5, the first to third engaging sections 26a to 26c are disposed in the first to third attachment recess portions 25a to 25c. The engaging sections 26a to 26c surround the front edge portion and right and left side edge portions of the mount surface 24. The first engaging section 26a disposed at the front edge portion of the mount surface 24 corresponds to the front surface 4a of the box body 2. The first engaging section 26a has a length corresponding to the length in the width direction of the front surface 4a. The second and third engaging sections 26b and 26c disposed at the right and left side edge portions of the mount surface 24 correspond to the right and left side surfaces 5a and 5b of the box body 2. The second and third engaging sections 26b and 26c have greater lengths than the lengths in the depth direction of the side surfaces 5a and 5b.

Each of the engaging sections 26a to 26c has an elongated plate-shaped main body 27, as shown in FIGS. 4 and 5. One end portion (or lower end portion) of the main body 27 of each engaging sections 26a, 26b, 26c is inserted in an associated one of the first to third attachment recess portions 25a to 25c. This end portion of the main body 27 is rotatably supported on the casing 16 by means of a rotational shaft 28. The rotational shaft 28 extends horizontally in each recess portion 25a, 25b, 25c.

The main body 27 of each engaging sections 26a, 26b, 26c has an upper end portion projecting upward beyond the mount surface 24. A claw portion 29 is integrally formed on the upper end portion of the main body 27. The claw portion 29 is sharpened, as shown in FIGS. 4 and 5, and can be detachably engaged in the associated recess portion 6a, 6b, 6c of the box body 2. Thus, the main body 27 of each engaging sections 26a, 26b, 26c is supported on the casing 16 so as to be rotatable on the rotational shaft 28 by a predetermined angle between a lock position where the claw portion 27 is engaged in the recess portion 6a, 6b, 6c and a unlock position where the claw portion 29 is disengaged from the recess portion 6a, 6b, 6c.

The main body 27 of each engaging portion 26a, 26b, 26c has a support portion 30 integrally. The support portion 30 extends toward the mount surface 24 between the claw portion 29 and rotational shaft 28. When the main body 27 is rotated in the unlock position, a distal end portion of the support portion 30 is situated on a slightly higher level than the mount surface 24, as shown in FIGS. 4 and 5 by two-dot-and-dash lines. Accordingly, when the box body 2 of the computer 1 is placed on the mount surface 24, the support portion 30 comes into contact with the bottom surface 3b of the box body 2.

As is shown in FIG. 2, a normally-open type first detection switch 31 is disposed on the mount surface 24. The first detection switch 31 detects whether or not the computer 1 is placed on the mount surface 24. The first detection switch 31 has an armature 31a exposed on the mount surface 24. The armature 31a comes into contact with the bottom surface 3b of the box body 2. Thus, when the computer 1 is placed on the mount surface 24, the armature 31a is pressed down by the bottom surface 3b of the box body 2 and the first detection switch 31 is turned on.

The casing 16 has a slide guide surface 35 which is continuous with the mount surface 24, as shown in FIG. 5. The slide guide surface 35 is situated behind the mount surface 24. The slide guide surface 35 extends horizontally on a level lower than the mount surface 24. A connector housing 36 is situated on the slide guide surface 35. The connector housing 36 is supported on the slide guide surface 35 slidably in the depth direction of the casing 16 between a position where the connector housing 36 is adjacent to the mount surface 24 and a position where the connector housing 36 is away from the mount surface 24.

The connector housing 36 has a top surface 37 which is flush with the mount surface 24, a first vertical connector mount surface 38 continuous with a front edge of the top surface 37, and a second vertical connector mount surface 39 continuous with the rear surface of the casing 16. When the computer 1 is placed on the mount surface 24, the first connector mount surface 38 faces the rear surface 4b of the box body 2. A second connector 40 is disposed on the first connector mount surface 38. The second connector 40 is slidable between a first position where the second connector 40 is connected to the first connector 13 and a second position where the second connector 40 is separated from the first connector 13 in accordance with the sliding of the connector housing 36.

As is shown in FIG. 3, a plurality of extension connectors 41 are arranged in a row on the second connector mount surface 39 of the connector housing 36. The extension connectors 41 are connected to peripheral devices for extending the functions of the computer 1 such as a printer, an external keyboard and a mouse. These extension connectors 41 are electrically connected to the second connector 40 via a circuit board (not shown).

As is shown in FIG. 5, the connector housing 36 has a bottom plate 36a superposed on the slide guide surface 35. A first relay connector 43 is disposed on the bottom plate 36a. The first relay connector 43 is connected to the second connector 40 via a wiring board (not shown).

A second relay connector 44 is disposed on the slide guide surface 35 of the connector housing 36. The second relay connector 44 is slidable in the depth direction of the casing 16. The second relay connector 44 is connected to the circuit board 20 via a flexible wiring board 45. The first relay connector 43 of the connector housing 36 is connected to the second relay connector 44. Thus, the second connector 40 is electrically connected to the CD-ROM 17 and HDD 18 within the casing 16 via the first and second relay connectors 43 and 44 and the circuit board 20.

Driving means 51 is provided within the casing 16. The driving means 51 rotates the second and third engaging sections 26b and 26c between the lock position and the unlock position and slides the connector housing 36. As is shown in FIG. 6, the driving means 51 comprises a first driving unit 52 for rotating the second and third engaging sections 26b and 26c, a second driving unit 53 for sliding the connector housing 36, an electric motor 54 which is rotatable in forward and reverse directions and serves as a driving source for both driving units 52 and 53, and an interlock mechanism 55 for transmitting a driving force of the electric motor 54 to the first and second driving units 52 and 53.

The first driving unit 52 comprises first and second racks 56a and 56b extending in the width direction of the mount surface 24 and a pair of pinions 57a and 57b meshed with the racks 56a and 56b. The pinions 57a and 57b are fixed to the rotational shafts 28 of the engaging sections 26b and 26c. Accordingly, the pinions 57a and 57b are rotatable integrally with the rotational shafts 28 and engaging sections 26b and 26c. The first rack 56a associated with the left-hand engaging section 26b has an extended portion 58 extended above the second rack 56b. The extended portion 58 is parallel to the second rack 56b.

The interlock mechanism 55 has a rotational shaft 60. The rotational shaft 60 is situated in parallel to a driving shaft 59 of the electric motor 54. A first pulley 61 is attached to one end portion of the rotational shaft 60. A second pulley 63 is attached to a distal end portion of the driving shaft 59. The first pulley 61 has a greater diameter than the second pulley 63. The first and second pulleys 61 and 63 are interlocked by means of a cogged belt 62. A driving gear 64 is attached to the other end portion of the rotational shaft 60. The driving gear 64 is interposed between the extended portion 58 and the second rack 56b. The driving gear 64 is meshed with the extended portion 58 and the second rack 56b. Accordingly, when the driving shaft 59 of the electric motor 54 is rotated counterclockwise, as indicated by arrow A in FIG. 6, a torque of the driving shaft 59 is transmitted to the rotational shaft 60 via the second pulley 63, the cogged belt 62 and the first pulley 61. Thereby, the driving gear 64 rotates in the direction of arrow A and the first and second racks 56a and 56b are slid away from each other. By the sliding movement, the pinions 57a and 57b and the rotational shafts 28 coupled to the pinions 57a and 57b are rotated by a predetermined angle in opposite directions, and the engaging sections 26b and 26c are simultaneously rotated to the lock position.

Figure 6:
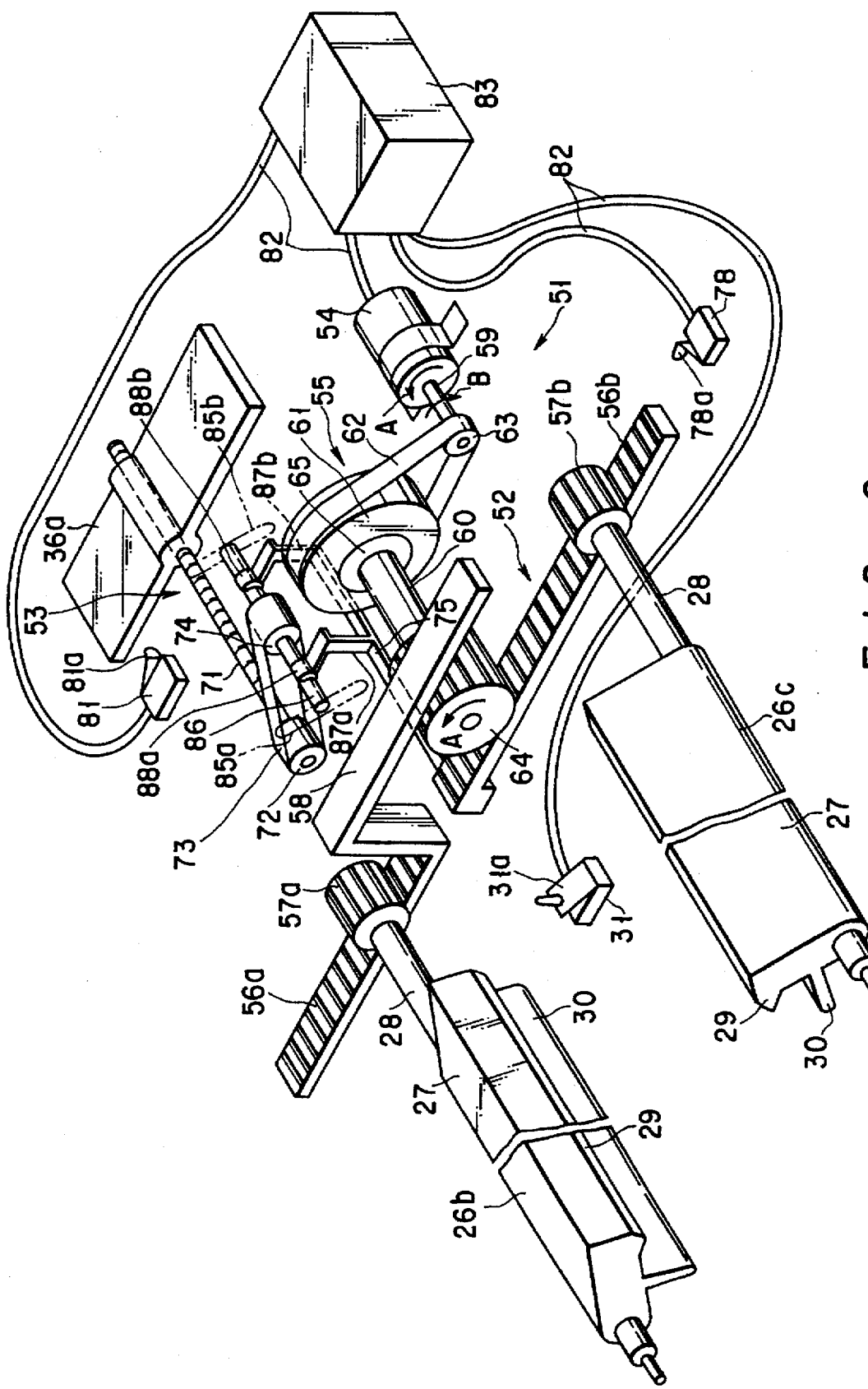

When the driving shaft 59 of the electric motor 54 is rotated clockwise, as indicated by arrow B in FIG. 6, a torque of the driving shaft 59 is transmitted to the driving gear 64 via the second pulley 63, cogged belt 62, first pulley 61 and rotational shaft 60. Thus, the first and second racks 56a and 56b are slid toward each other by means of the driving gear 64. By the sliding movement, the pinions 57a and 57b and the rotational shafts 28 are rotated by a predetermined angle, and the engaging sections 26b and 26c are rotated from the lock position to the unlock position.

In this case, a torque limiter 65 is disposed between the rotational shaft 60 and the first pulley 61. If a reverse load of a predetermined level or above is applied from the rotational shaft 60 to the first pulley 61 while the rotational shaft 60 is being rotated in the direction of arrow A, the torque limiter 65 cuts off the torque transmission from the first pulley 61 to the rotational shaft 60. Accordingly, when the engaging sections 26b and 26c are rotated to the lock position, as mentioned above, and the claw portions 29 have been just engaged in the recess portions 6b and 6c of the computer 1, the rotation of the rotational shaft 60 is stopped.

The first engaging portion 26a provided at the front edge of the mount surface 24 is not interlocked with the driving means 51 and is freely rotatable. In the present embodiment, the first engaging portion 26a is rotationally urged to the unlock position at all times by a spring (not shown).

The second driving unit 53 of the driving means 51 has a feed screw 71. The feed screw 71 extends in the direction of sliding movement of the connector housing 36 and is screwed into the bottom plate 36a of the connector housing 36. A first interlock pulley 72 is attached to one end portion of the feed screw 71.

As is shown in FIG. 6, the connector housing 36 is provided with a pair of guide holes 85a and 85b. The guide holes 85a and 85b have an elongated shape extending in the width direction of the connector housing 36 and are arcuated around the feed screw 71. The guide holes 85a and 85b are situated above the large-diameter first pulley 61. A pivot shaft 86 is passed between the guide holes 85a and 85b. The pivot shaft 86 is slidable along the guide holes 85a and 85b. A second interlock pulley 74 is attached to the pivot shaft 86. The second interlock pulley 74 can be moved in accordance with the sliding movement of the pivot shaft 86 between a position where the second interlock pulley 74 is put in contact with the first pulley 61 and a position where the second interlock pulley 74 is separated from the first pulley 61. The second interlock pulley 74 is constantly urged to the position where it is put in contact with the first pulley 61 by a spring (not shown). The second interlock pulley 74 and the first interlock pulley 74 are interlocked by a cogged belt 73.

As is shown in FIG. 6, the second rack 56b has a stay 75 extending toward the first pulley 61. The stay 75 has a distal end portion situated below the pivot shaft 86. This distal end portion is provided with a pair of leg portions 87a and 87b. The leg portions 87a and 87b extend from the stay 75 toward the pivot shaft 86. Distal end of the leg portions 87a and 87b are provided with stoppers 88a and 88b for receiving the pivot shaft 86. The stoppers 88a and 88b are situated on both sides of the second interlock pulley 74 in the axial direction. The stoppers 88a and 88b come into, and go out of, contact with the pivot shaft 86 in accordance with the sliding movement of the second rack 56b. Specifically, the stoppers 88a and 88b go out of contact with the pivot shaft 86 just before the second and third engaging sections 26b and 26c reach the lock position. Accordingly, the second interlock pulley 74 is pressed on the first pulley 61 by the spring and a torque of the first pulley 61 is transmitted to the first interlock pulley 72 via the cogged belt 73. As a result, the feed screw 71 is rotated in interlock with the electric motor 54 and the connector housing 36 is slid toward the first position. Thus, the second connector 40 is advanced toward the computer 1 on the mount surface 24 and is coupled to the first connector 13.

When the driving shaft 59 of the electric motor 54 is rotated reversely, the feed screw 71 is also rotated reversely. Thus, the connector unit 36 is slid from the first position toward the second position. By this sliding movement, the second connector 40 is separated from the first connector 13, and the connection between these connectors 40 and 13 is released.

As is shown in FIG. 6, a normally open type second detection switch 78 is disposed on the right side of the second rack 56b. The second detection switch 78 detects the state in which the second and third engaging sections 26b and 26c have been rotated to the lock position. The second detection switch 78 includes an armature 78a situated to face a right end portion of the second rack 56b. The armature 78a is pushed by the second rack 56b when the engaging sections 26a and 26b have been rotated to the lock position. When the armature 78a is pushed, the second detection switch 78 is turned on.

In addition, a normally open type third detection switch 81 is disposed in front of the bottom plate 36a of the connector housing 36, as shown in FIG. 6. The third detection switch 81 detects the state in which the connector housing 36 has been slid to the first position. The third detection switch 81 has an armature 81a situated to face the bottom plate 36a. When the connector housing 36 has been slid to the first position, the armature 81a is pushed by a front edge portion of the bottom plate 36a and the third detection switch 81 is turned on.

The first to third detection switches 31, 78 and 81 and the electric motor 54 are connected to a control unit 83 via cables 82. The control unit 83 receives signals from the first to third detection switches 31, 78 and 81 and controls the switching-on/off and the direction of rotation of the electric motor 54 on the basis of the received signals.

The procedures for attaching the computer 1 to the extension unit 15 will now be described.

FIG. 2 shows the state in which the computer 1 is about to be attached to the extension unit 15. In this case, the display unit 12 of the computer 1 is closed, but the display unit 12 may be opened. The extension unit 15 is connected to a power supply and the electric motor 54 and control unit 83 are set in the standby state. The first to third engaging sections 26a to 26c and the connector housing 36 are set in the second position.

The computer 1 is first placed on the mount surface 24 of the extension unit 15. In this case, the support portions 30 of the first to third engaging sections 26a to 26c project slightly beyond the mount surface 24 at the front end portion and right and left side portions of the mount surface 24. Thus, when the computer 1 is placed on the mount surface 24, the bottom surface 3b of the box body 2 comes into contact with the support portions 30. Since the first engaging section 26a disposed at the front edge portion of the mount surface 24 is freely rotatable, it rotates automatically about the rotational shaft 28 by the weight of the computer 1 if the bottom surface 3b of the box body 2 comes into contact with the support portion 30 of the first engaging section 26a. By this rotation, the claw portion 29 of the first engaging section 26a slightly enters the recess portion 6a in the front surface 4a of the box body 2. Thereby, the computer 1 is roughly aligned with the first to third engaging sections 26a to 26c.

When the computer 1 is placed on the mount surface 24, the bottom surface 3b of the box body 2 comes into contact with the armature 31a of the first detection switch 31 and the armature 31a is pushed down. Thus, the first detection switch 31 is turned on, and a signal indicating the mounting of the computer 1 on the mount surface 24 is delivered to the control unit 83.

If the signal indicating the presence of the computer 1 is input to the control unit 83, the control unit 83 outputs a driving signal to the electric motor 54. The driving shaft 59 of the electric motor 54 starts to rotate counterclockwise. The torque of the driving shaft 59 is transmitted to the rotational shaft 60 via the second pulley 63, cogged belt 62 and first pulley 61. The driving gear 64 is rotated in the same direction as the driving shaft 59. In accordance with the rotation of the driving gear 64, the first and second racks 56a and 56b are slid away from each other and the rotational shafts 28 are rotated by a predetermined angle via the pinions 57a and 57b.

Thereby, the second and third engaging sections 26b and 26c disposed on both sides of the computer 1 are rotated from the unlock position to the lock position and the claws 29 of these engaging sections are engaged in the recess portions 6b and 6c in the right and left side surfaces 5a and 5b of the box body 2. In this case, the claws 29 of the second and third engaging sections 26b and 26c rotate in a downward arc about the rotational shafts 28, as indicated by symbol $X_1$ in FIG. 4. When the claws 29 are engaged in the recess portions 26b and 26c, the box body 2 receives such a force that the box body 2 is pressed on the mount surface 24, and the box body 2 is immovably held on the mount surface 24.

The first engaging section 26a engaged in the front surface 4a of the box body 2 in advance is rotated to the lock position in accordance with the movement of the box body 2. The first engaging section 26a cooperates with the second and third engaging sections 26b and 26c to hold the box body 2 on the mount surface 24.

When the second and third engaging sections 26b and 26c are rotated to the lock position, the second rack 56b has been slid to the right greatly and the armature 78a of the second detection switch 78 is pushed by the right end portion of the second rack 56b. Thereby, the second detection switch 78 is turned on and a signal indicating the fact that the box body 2 has been held to the mount surface 24 is sent to the control unit 83.

In accordance with the rightward sliding movement of the second rack 56b, the stoppers 88a and 88b move to the right. Accordingly, the pivot shaft 86 moves downward along the guide holes 85a and 85b and the second interlock pulley 74 approaches the first pulley 61 gradually. The stoppers 88a and 88b are separated from the pivot shaft 86 immediately before the second and third engaging sections 26b and 26c reach the lock position. As a result, the second interlock pulley 74 is pressed on the first pulley 61 by the force of the spring. The second interlock pulley 74 comes into contact with the first pulley 61 and the cogged belt 73 is clamped between the second interlock pulley 74 and the first pulley 61.

When the second and third engaging sections 26b and 26c are rotated to the first position, the claw portions 29 are engaged in the recess portions 6b and 6c and further movement of the second and third engaging sections 26b and 26c is prohibited. Consequently, a reverse load to prevent the rotation of the first pulley 61 acts on the first pulley 61. Then, the torque limiter 65 begins to operate and cuts off the torque transmission from the first pulley 61 to the rotational shaft 60. Accordingly, the torque transmission path of the motor 54 to the first driving unit 52 is switched to that to the second driving unit 53.

when the cogged belt 73 is clamped between the second interlock pulley 74 and the first pulley 61, the cogged belt 73 begins to run in accordance with the movement of the first pulley 61. The torque of the first pulley 61 is transmitted to the feed screw 71 via the first interlock pulley 72 and cogged belt 73. Thereby, the feed screw 71 rotates and the connector housing 36 is slid from the second position to the first position.

When the connector housing 36 has reached the first position, the second connector 40 is coupled to the first connector 13, and the computer 1 is electrically connected to the CD-ROM 17 and HDD 18. In addition, when the connector housing 36 has been slid to the first position, the armature 81a of the third detection switch 81 is pushed by the front end portion of the bottom plate 36a. Thus, the third detection switch 81 is turned on and the signal indicating the fact that the connector housing 36 has been connected to the computer 1 is sent to the control unit 83. The control unit 83 outputs a signal to halt the driving of the electric motor 54, and the engaging sections 26b and 26c and connector housing 36 are held in the first position. By the series of these operations, the electrical and mechanical connection between the computer 1 and extension unit 15 is completed.

When the extension unit 15 is removed from the computer 1, the display unit 12 is rotated to the open position and the keyboard 10 is exposed. The keys 11 of the keyboard 10 are operated according to a predetermined procedure and a command to remove the computer 1 is input to the control unit 83. Thereby, the control unit 83 delivers a driving signal to the electric motor 54 and rotates the driving shaft 59 of the electric motor 54 clockwise. Accordingly, the first pulley 61 is rotated via the cogged belt 62. Since the cogged belt 73 of the second driving unit 53 is clamped between the second interlock pulley 74 and the first pulley 61, the torque of the first pulley 61 is transmitted to the cogged belt 73. The feed screw 71 is rotated by the cogged belt 73 and the connector housing 36 is retreated from the second position to the first position. As a result, the second connector 40 is disengaged from the first connector 13, and electrical connection between the computer 1 and extension unit 15 is released.

Since the torque of the first pulley 61 is transmitted to the driving gear 64 via the rotational shaft 60, the first and second racks 56a and 56b are slid towards each other. In accordance with the sliding movement of the racks 56a and 56b, the stay 75 having the stoppers 88a and 88b approaches the pivot shaft 86 gradually. When the second connector 40 has been disengaged from the first connector 13, as mentioned above, the stoppers 88a and 88b come into contact with the pivot shaft 86, and the second interlock pulley 74 is pushed in such a direction as to go away from the first pulley 61. Thus, transmission of driving power to the second driving unit 53 is cut off. Similarly, when the first and second racks 56a and 56b are slid, the rotational shafts 28 are rotated via the pinions 57a and 57b by a predetermined angle and the second and third engaging sections 26b and 26c are rotated from the first position to the second position. Thus, the claw portions 29 of the second and third engaging sections 26b and 26c are disengaged from the recess portions 6b and 6c of the right and left side surfaces 5a and 5b of the box body 2. Thus, releasing the holding of the box body 2. In this case, the support portions 30 of the first to third engaging sections 26a to 26c rotate in an upward arc, as shown in FIGS. 4 and 5. Thus, when the support portions 30 have come into contact with the bottom surface 3b of the box body 2, the box body 2 receives an upward pushing force so that it is lifted from the mount surface 24. Consequently, the box body 2 is slightly lifted from the mount surface 24 and the armature 31a of the first detection switch 31, which has been depressed by the bottom surface 3b of the box body 2, is released. As a result, the first detection switch 31 is turned off, and a signal indicating the release of connection between the computer 1 and extension unit 15 is input to the control unit 83. Upon receiving the signal, the control unit 83 outputs a signal to stop the motor 54 and the series of operations to remove the computer 1 are completed.

According to the first embodiment of the present invention, the computer 1 can be connected to the extension unit 15 only by placing the box body 2 of the computer 1 on the mount surface 24 of the extension unit 15. The prevention of disconnection of the box body 2 and the electrical connection between the first connector 13 and second connector 40 are automatically effected. As compared to the prior art in which the computer 1 is manually connected, the connection between the computer 1 and extension unit 15 is facilitated.

The engagement between the second and third engaging sections 26b and 26c and the recess portions 6b and 6c of box body 2 is maintained by the meshing-type driving means 51 utilizing the first and second racks 56a and 56b and pinions 57a and 57b. Thus, the second and third engaging sections 26b and 26c cannot be rotated to the second position by the fingers, etc. In particular, in the present embodiment, since the claw portions 29 of the first to third engaging sections 26a to 26c are engaged in the recess portions 6a to 6c of the front surface 4a and side surfaces 5a and 5b of box body 2, the engagement between the engaging sections 26a to 26c and the box body 2 is firm. In addition, since the engagement areas between the first to third engaging sections 26a to 26c and the box body 2 are not exposed, the fingertips cannot easily be inserted into the engagement areas. Accordingly, the holding of the box body 2 by the first to third engaging sections 26a to 26c cannot forcibly be released, and the stealing of the computer 1 can surely be prevented.

Besides, when the computer 1 is removed from the mount surface 24, the holding of the box body 2 by the first to third engaging sections 26a to 26c and the connection between the first and second connectors 13 and 40 are automatically released. In the prior art, it is necessary to unlock the computer 1 or to pull out the box body 2 against the engagement force of the first and second connectors 13 and 40. Such time-consuming procedures are not required in the present embodiment. Thus, the computer 1 can be easily removed from the extension unit 15.

Moreover, when the second and third engaging sections 26b and 26c are rotated to the second position, the keys 11 of the keyboard 10 need to be operated according to a predetermined procedure. Unless one knows the operation procedure of the keys 11, he cannot control the electric motor 54 of the driving means 51. Therefore, the stealing of the computer 1 can be prevented effectively.

The first to third engaging sections 26a to 26c for holding the computer 1 on the mount surface 24 of the extension unit 15 are provided at the three positions on the front surface 4a and right and left side surfaces 5a and 5b of the box body 2. The box body 2 is held in three directions. Thus, the computer 1 is exactly aligned with the mount surface 24.

The first to third engaging sections 26a to 26c have lengths covering the entire lengths of the front surface 4a and right and left side surfaces 5a and 5b of the box body 2. Thus, sufficient lengths of engagement areas between the engaging sections 26a to 26c and the box body 2 can be obtained and the computer 1 can be firmly fixed on the mount surface 24.

Since the first to third engaging sections 26a to 26c are rotatably supported on the casing 16 by means of the horizontal rotational shafts 28, the space for installation of the engaging sections 26a to 26c can be reduced, as compared to the case where the engaging sections 26a to 26c are slid horizontally over the mount surface 24. The size of the casing 16 can be reduced accordingly.

The first driving unit 52 for rotating the second and third engaging sections 26b and 26c and the second driving unit 53 for sliding the connector having 36 have a single common driving source or the electric motor 54. There is no need to provide two electric motors 54 for the respective driving units 52 and 53. The structure of the driving means 51 can thus be simplified, the manufacturing cost of the extension unit 15 can be reduced, and the size and weight of the extension unit 15 can be reduced.

According to the above structure, when the computer 1 is connected to, and disconnected from, the extension unit 15, it suffices to slid the connector housing 36 which is much smaller than the computer 1. In the prior art, the first connector 13 and second connector 40 are connected by sliding the computer 1. In this case, since the weight of the computer 1 is greater than that of the connector housing 36, a greater sliding force is required. Consequently, when the computer 1 is put in the extension unit 15, the first connector 13 may be engaged with the second connector 40 with an excessive engaging force greater than an optimal level. If the connector housing 36 is slid, the engaging force between the first and second connectors 13 and 40 is not influenced by the weight of the computer 1. Thus, an undesirable force is prevented from acting on the first and second connectors 13 and 40, and the reliability of connection is enhanced.

Figure 7:
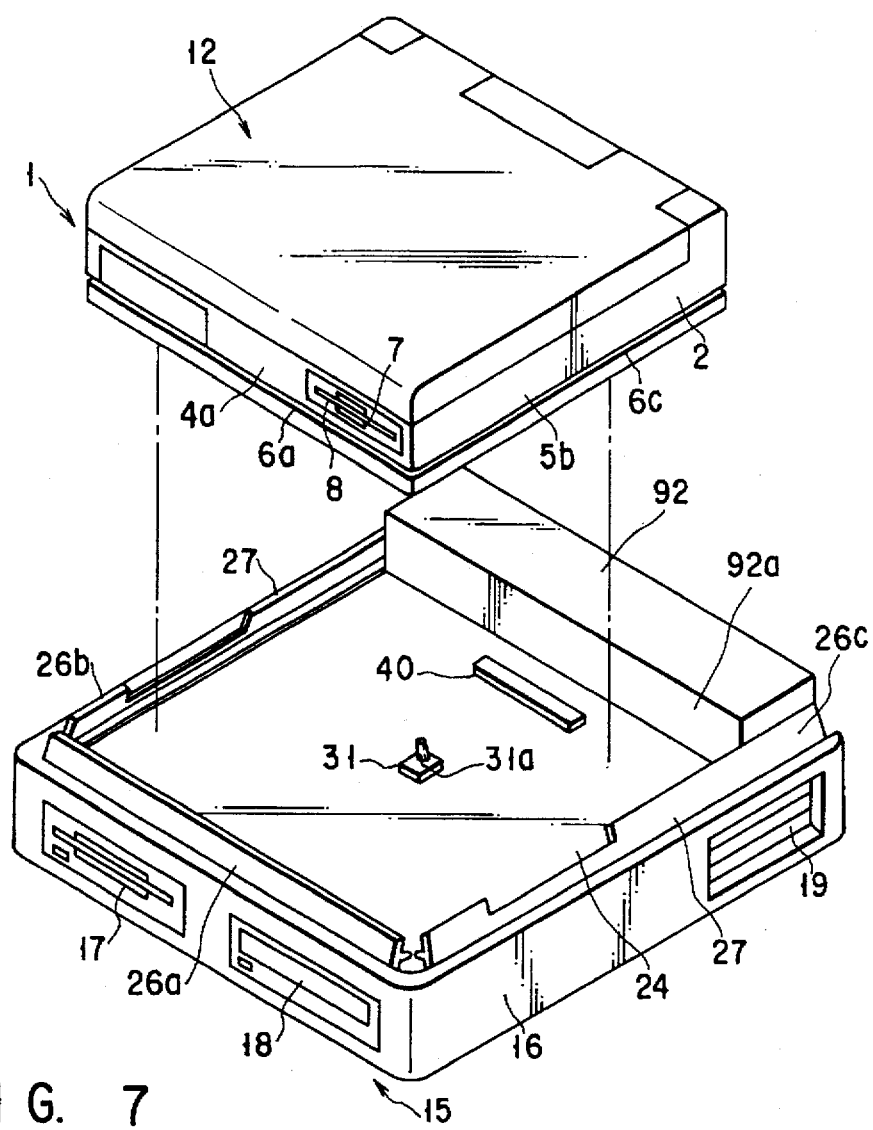

The present invention is not limited to the first embodiment. A second embodiment of the invention will now be described with reference to FIGS. 7 and 8.

The second embodiment differs principally from the first embodiment with respect to the structure of the connector for electrically connecting the computer 1 and extension unit 15, and both embodiments are substantially the same with respect to the other structural features. Therefore, the structural elements common to the first embodiment are denoted by like reference numerals and a description thereof is omitted.

Figure 8:
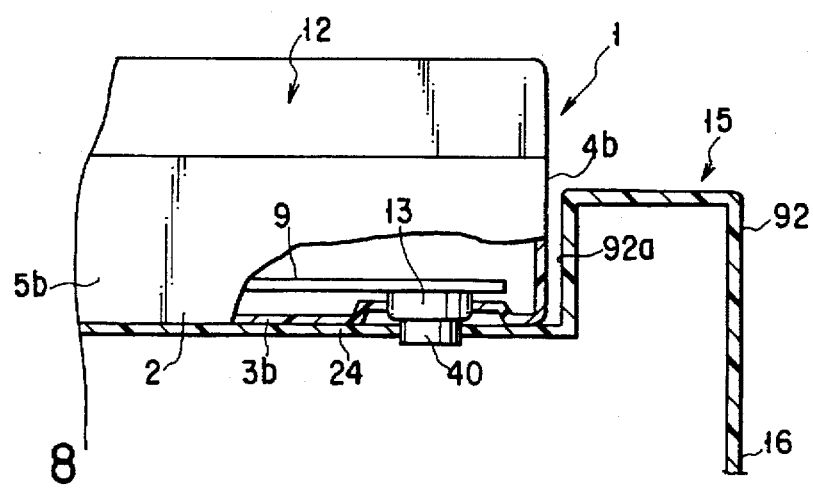

As is shown in FIG. 8, a first connector 13 is attached to the bottom surface of the circuit board 9. The first connector 13 is situated at a rear part of the bottom surface 3b of the box body 2 and is exposed to the bottom surface 3b.

A stopper portion 92 is provided at a rear end part of the mount surface 24 of the casing 16. The stopper portion 92 is projected upward from the mount surface 24. The stopper portion 92 has a stopper surface 92a. The stopper surface 92a is opposed to the rear surface 4b of the box body 2. The rear part of the computer 1 is aligned with the mount surface 24 by virtue of the stopper surface 92a. A second connector 40 of the extension unit 15 is situated at a rear end portion of the mount surface 24. The second connector 40 adjoins the stopper surface 92a.

In the second embodiment, when the computer 1 is placed on the mount surface 24, the first connector 13 is opposed to the second connector 40. If the second and third engaging sections 26b and 26c are rotated to the first position in this state, the box body 2 of the computer 1 is pushed on the mount surface 24 and the first connector 13 is coupled to the second connector 40.

According to the structure of the second embodiment, the direction in which the computer 1 is pushed on the mount surface 24 coincides with the direction in which the first connector 13 is connected with the second connector 40. Accordingly, at the time when the computer 1 has been held on the mount surface 24, the connection between the first and second connectors 13 and 40 is completed at the same time. The connection between the computer 1 and extension unit 15 can be completed in a short time.

According to the above structure, it should suffice if the second connector 40 is placed on the mount surface 24, and there is no need to move the second connector 40 towards and away from the computer 1. Thus, the structure of the attachment part of the second connector 40 can be simplified. In addition, since the second connector 40 is stationary, the second driving unit 53 of the driving means 51 is not needed. Thus, the structure of the driving means 51 is also simplified.

In the first embodiment, the engaging sections are provided at the three positions on the front end portion and right and left side portions of the mount surface. However, the present invention is not limited to this structure. The engaging sections may be provided on the right and left side portions of the mount surface. Alternatively, the engaging section may be provided on one of the right and left side portions of the mount surface, and a stopper for receiving the box body may be provided on the other of the side portions.

The engaging sections need not be provided over the entire lengths of the front and side surfaces of the box body. In addition, the associated recess portions need not be provided over the entire lengths of the front and side surfaces of the box body. The recess portions may be formed in only parts of the respective surfaces.

The electronic apparatus in the present invention is not limited to the book-type portable computer, but it may be an information processing device such as a word processor.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An electronic system comprising:

an electronic apparatus including a rear surface having a first connector, and right and left side surfaces continuous with said rear surface; and an extension unit having a second connector detachably coupled to said first connector, wherein said extension unit comprises:

a mount portion on which said electronic apparatus is detachably mounted, engaging means placed on said mount portion having first and second engaging sections, said first and second engaging sections being rotatable between a lock position where the first and second engaging sections are engaged with the right and left side surfaces of said apparatus and thereby holds said electronic apparatus on said mount portion, and an unlock position where the first and second engaging sections are moved away from said right and left side surfaces, and driving means for moving said first and second engaging sections between the lock position and the unlock position.

2. The electronic system according to claim 1, wherein said extension unit includes an extension device for extending the function of the electronic apparatus, said extension device being connected to said second connector.

3. The electronic system according to claim 1, wherein said extension unit includes a plurality of extension connectors coupled to said second connector.

4. The electronic system according to claim 1, wherein said extension unit includes detection means for detecting whether the electronic apparatus is placed on the mount portion, and when said detection means has detected the presence of the electronic apparatus, said driving means moves the first and third engaging sections to the lock position.

5. The electronic system according to claim 1, wherein said first and second engaging sections have lengths covering the entire lengths of the side surfaces of the electronic apparatus.

6. The electronic system according to claim 1, wherein said first and second engaging sections have tapered claw portions, and said right and left side surfaces of the electronic apparatus have recess portions in which said claw portions of the engaging sections are detachably engaged.

7. The electronic system according to claim 1, wherein said first and second engaging sections have support portions which are put in contact with a bottom surface of said electronic apparatus when said first and second engaging sections are rotated to the unlock position.

8. An electronic system comprising:

an electronic apparatus having a first connector on a rear surface thereof;

an extension unit having a mount portion on which said electronic apparatus is detachably mounted, said extension unit having a connector housing, said connector housing being movable between a position where the connector housing is moved towards said mount portion and a position where the connector housing is moved away from the mount portion, said connector housing having a connector mount surface opposite the rear surface of said electronic apparatus when said electronic apparatus is mounted on said mount portion, a second connector being disposed on said connector mount surface, said second connector being connected to said first connector when said connector housing is moved toward said electronic apparatus mounted on said mount portion; and driving means for moving said connector housing toward and away from said electronic apparatus placed on said mount portion, said driving means including an electric motor and an interlock mechanism for interlocking said electric motor and said connector housing.

9. The electronic system according to claim 8, wherein said extension unit includes an extension device for extending the function of the electronic apparatus, said extension device being connected to said second connector.

10. The electronic system according to claim 8, wherein said extension unit includes a plurality of extension connectors coupled to said second connector.

11. The electronic system according to claim 8, wherein said extension unit includes detection means for detecting whether the electronic apparatus is placed on the mount portion, and when said detection means has detected the presence of the electronic apparatus, said driving means moves the connector housing toward the electronic apparatus.

12. The electronic system according to claim 8, wherein said extension unit has a slide surface continuous with said mount portion, said connector housing being movably supported by said slide surface.

13. An electronic system comprising:

an electronic apparatus having a first connector on a rear surface thereof;

an extension unit having a mount portion on which said electronic apparatus is detachably mounted, said extension unit including a second connector movable toward and away from the electronic apparatus placed on the mount portion, said second connector being coupled to said first connector when said second connector is moved toward the electronic apparatus; and driving means, contained in said extension unit, for moving said second connector toward and away from the electronic apparatus, said driving means including an electric motor and an interlock mechanism for interlocking said electric motor and said second connector.

14. The electronic system according to claim 13, wherein said extension unit includes an extension device for extending the function of the electronic apparatus, said extension device being connected to said second connector.

15. The electronic system according to claim 13, wherein said extension unit includes detection means for detecting whether the electronic apparatus is placed on the mount portion, and when said detection means has detected the presence of the electronic apparatus, said driving means moves the second connector toward the electronic apparatus.

16. The electronic system according to claim 13, wherein said extension unit has a slide surface continuous with said mount portion and a connector housing situated on said slide surface, said connector housing is slid between a position where the connector housing is approached to the mount portion by means of said driving means and a position where the connector housing is moved away from the mount portion by means of said driving means, and said connector housing has a connector mount portion opposed to the rear surface of the electronic apparatus, said second connector being disposed on said connector mount portion.

17. An electronic system comprising:

an electronic apparatus having a first connector on a rear surface thereof;

an extension unit having a mount portion on which said electronic apparatus is detachably mounted, said extension unit including a second connector movable toward and away from the electronic apparatus placed on the mount portion, said second connector being coupled to said first connector when said second connector is moved toward the electronic apparatus;

driving means, contained in said extension unit, for moving said second connector toward and away from the electronic apparatus, said driving means including an electric motor and an interlock mechanism for interlocking said electric motor and said second connector; and detection means for detecting whether the electronic apparatus is placed on the mount portion, and when said detection means has detected the presence of the electronic apparatus, said driving means moves the second connector toward the electronic apparatus.

18. The electronic system according to claim 17, wherein said electronic apparatus has a bottom surface continuous with said rear surface, said mount portion having a mount surface on which said bottom surface is superposed, said detection means being disposed on said mount surface.

19. The electronic system according to claim 17, further comprising engaging means provided on said mount portion, said engaging means being movable between a lock position where the engaging means is engaged with the electronic apparatus and thereby holds the electronic apparatus on the mount portion, and an unlock position where the engaging means is disengaged from the electronic apparatus, said engaging means being moved to said lock position before said second connector is moved toward said electronic apparatus.

20. An extension unit for extending a function of an electronic apparatus having a first connector on its rear surface comprising:

a casing having a mount portion on which said electronic apparatus is detachably mounted;

a connector housing supported by said casing, said connector housing being movable between a position where the connector housing is moved towards said mount portion and a position where the connector housing is moved away from the mount portion, said connector housing having a connector mount surface opposite the rear surface of said electronic apparatus when said electronic apparatus is mounted on said mount portion;

a second connector disposed on said connector mount surface, said second connector being connected to said first connector when said connector housing is moved toward said electronic apparatus mounted on said mount portion; and driving means for moving said connector housing toward and away from said electronic apparatus placed on said mount portion, said driving means including an electric motor and an interlock mechanism for interlocking said electric motor and said connector housing.

21. The extension unit according to claim 20, wherein said casing includes detection means for detecting whether the electronic apparatus is placed on the mount portion, and when said detection means has detected the presence of the electronic apparatus, said driving means moves the connector housing toward the electronic apparatus.

22. An extension unit for extending a function of an electronic apparatus having a first connector on its rear surface comprising:

a casing having a mount portion on which said electronic apparatus is detachably mounted;

a second connector provided at said casing, said second connector movable toward and away from the electronic apparatus placed on the mount portion, said second connector being coupled to said first connector when said second connector is moved toward the electronic apparatus; and driving means, contained in said casing, for moving said second connector toward and away from the electronic apparatus, said driving means including an electric motor and an interlock mechanism for interlocking said electric motor and said second connector.

23. The extension unit according to claim 22, wherein said casing includes an extension device for extending the function of the electronic apparatus, said extension device being connected to said second connector.

24. The extension unit according to claim 22, wherein said casing includes detection means for detecting whether the electronic apparatus is placed on the mount portion, and when said detection means has detected the presence of the electronic apparatus, said driving means moves the second connector toward the electronic apparatus.

25. An extension unit for extending a function of an electronic apparatus having a rear surface having a first connector and right and left side surfaces continuous with the rear surface comprising:

a mount portion on which said electronic apparatus is detachably mounted;

engaging means placed on said mount portion having first and second engaging sections, said first and second engaging sections being rotatable between a lock position where the first and second engaging sections are engaged with the right and left side surfaces of said apparatus and thereby holds said electronic apparatus on said mount portion, and an unlock position where the first and second engaging sections are moved away from said right and left side surfaces; and driving means for moving said first and second engaging sections between the lock position and the unlock position.

26. An extension unit for extending a function of an electronic apparatus having a first connector on its rear surface comprising:

a casing having a mount portion on which said electronic apparatus is detachably mounted;

a second connector provided at said casing, said second connector movable toward and away from the electronic apparatus placed on the mount portion, said second connector being coupled to said first connector when said second connector is moved toward the electronic apparatus;

driving means, contained in said casing, for moving said second connector toward and away from the electronic apparatus, said driving means including an electric motor and an interlock mechanism for interlocking said electric motor and said second connector; and detection means for detecting whether the electronic apparatus is placed on the mount portion, and when said detection means has detected the presence of the electronic apparatus, said driving means moves the second connector toward the electronic apparatus.

27. The extension unit according to claim 26, wherein said electronic apparatus having a bottom surface continuous with said rear surface, said mount portion having a mount surface on which said bottom surface is superposed, said detection means being disposed on said mount surface.

28. The extension unit according to claim 26, further comprising engaging means provided on said mount portion, said engaging means being movable between a lock position where the engaging means is engaged with the electronic apparatus and thereby holds the electronic apparatus on the mount portion, and an unlock position where the engaging means is disengaged from the electronic apparatus, said engaging means being moved to said lock position before said second connector is moved toward said electronic apparatus.

29. A method for installing an electronic apparatus in an extension unit having a mount portion on which the electronic apparatus is detachably mounted and a second connector movable towards or away from the electronic apparatus mounted on the mount portion, the method comprising the steps of:

mounting the electronic apparatus on the mount portion of the extension unit;

detecting whether an electronic apparatus is mounted on the mount portion and outputting a signal when an electronic apparatus is mounted on the mount portion; and moving the second connector towards the electronic apparatus by using an electric motor driven in accordance with the signal and connecting the first connector to the second connector of the electronic apparatus.

30. A method according to claim 29 wherein the electric apparatus mounted on the mount portion is held in a fixed position of the mount portion before the second connector is moved towards the apparatus, whereby the second connector and the first connector are aligned.

31. A method according to claim 29 further comprising a fourth method for detecting the position of the second connector and stopping the electric motor when the first connector and the second connector are connected.

* * * * *